United States Patent
Song et al.

(10) Patent No.: US 12,041,327 B2
(45) Date of Patent: Jul. 16, 2024

(54) CAMERA WITH META-LENS AND ELECTRONIC DEVICE INCLUDING SAME

(71) Applicant: SAMSUNG ELECTRONICS CO., LTD., Suwon-si (KR)

(72) Inventors: Doukyoung Song, Suwon-si (KR); Sangeun Mun, Suwon-si (KR); Jina Jeon, Suwon-si (KR); Hyoungil Song, Suwon-si (KR); Seunghoon Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 181 days.

(21) Appl. No.: 17/588,102

(22) Filed: Jan. 28, 2022

(65) Prior Publication Data

US 2022/0232148 A1  Jul. 21, 2022

Related U.S. Application Data

(63) Continuation of application No. PCT/KR2022/000829, filed on Jan. 17, 2022.

(30) Foreign Application Priority Data

Jan. 18, 2021 (KR) .................. 10-2021-0006913

(51) Int. Cl.
*H04N 23/55* (2023.01)
*G02B 1/00* (2006.01)
(Continued)

(52) U.S. Cl.
CPC ............. *H04N 23/51* (2023.01); *G02B 1/002* (2013.01); *G02B 3/00* (2013.01); *H04N 23/54* (2023.01);
(Continued)

(58) Field of Classification Search
CPC ........ H04N 23/51; H04N 23/54; H04N 23/55; H04N 23/00; G02B 27/017;
(Continued)

(56) References Cited

U.S. PATENT DOCUMENTS

2007/0164329 A1\* 7/2007 Toshikiyo ......... H01L 27/14621
257/E31.128
2009/0283809 A1   11/2009 Hsin et al.
(Continued)

FOREIGN PATENT DOCUMENTS

CN         111866387       10/2020
KR     10-2009-0119659     11/2009
(Continued)

OTHER PUBLICATIONS

Search Report and Written Opinion issued May 2, 2022 in counterpart International Application No. PCT/KR2022/00829.
(Continued)

*Primary Examiner* — Mekonnen D Dagnew
(74) *Attorney, Agent, or Firm* — Nixon & Vanderhye, P.C.

(57) ABSTRACT

An electronic device according to various embodiments disclosed herein may include a lens assembly having a structure in which at least one meta-lens and a spacer member are stacked, and an image sensor assembly attached to one side of the lens assembly to receive light passing through the lens assembly and convert the light into an optical signal. The spacer member may be fixed to one side of the lens assembly between the image sensor assembly and the lens assembly such that a cavity is defined by an inner side surface of the spacer member, a bottom surface of the lens assembly, and a top surface of the image sensor assembly.

16 Claims, 20 Drawing Sheets

(51) Int. Cl.
  *G02B 3/00* (2006.01)
  *H04N 23/51* (2023.01)
  *H04N 23/54* (2023.01)
  *G02B 5/18* (2006.01)
  *G02B 27/01* (2006.01)

(52) U.S. Cl.
  CPC ........... *H04N 23/55* (2023.01); *G02B 5/1809* (2013.01); *G02B 5/1871* (2013.01); *G02B 27/017* (2013.01); *G02B 2027/0178* (2013.01)

(58) Field of Classification Search
  CPC .. G02B 2027/0178; G02B 7/02; G02B 27/01; G02B 3/00; G02B 1/002; G02B 27/0172; G02B 27/0176; G03B 17/12; G03B 30/00
  See application file for complete search history.

(56) References Cited

U.S. PATENT DOCUMENTS

| | | |
|---|---|---|
| 2010/0214456 A1 | 8/2010 | Tokuda et al. |
| 2011/0122308 A1 | 5/2011 | Duparre |
| 2016/0178805 A1 | 6/2016 | Kang et al. |
| 2017/0064212 A1* | 3/2017 | Wexler ................. G06V 40/166 |
| 2020/0014827 A1 | 1/2020 | Winden et al. |
| 2020/0176496 A1 | 6/2020 | Kimura et al. |
| 2020/0264343 A1 | 8/2020 | Han et al. |
| 2020/0271941 A1 | 8/2020 | Riley, Jr. et al. |
| 2021/0014394 A1 | 1/2021 | Han et al. |
| 2021/0028215 A1* | 1/2021 | Devlin ............... G02B 27/4244 |
| 2021/0172879 A1* | 6/2021 | Chen ................... G01N 21/8806 |
| 2022/0236796 A1* | 7/2022 | Konrad .................. G09G 3/002 |

FOREIGN PATENT DOCUMENTS

| | | |
|---|---|---|
| KR | 10-2018-0037909 | 4/2018 |
| KR | 10-2018-0132014 | 12/2018 |
| KR | 10-2020-0014291 | 2/2020 |
| KR | 10-2020-0099832 | 8/2020 |
| KR | 10-2022-0035971 | 3/2022 |
| KR | 10-2450594 | 10/2022 |

OTHER PUBLICATIONS

Extended Search Report dated Apr. 23, 2024 in European Patent Application No. 22739815.3.

* cited by examiner

CAMERA WITH META-LENS AND ELECTRONIC DEVICE INCLUDING SAME

CROSS-REFERENCE TO RELATED APPLICATIONS

This application is a continuation of International Application No. PCT/KR2022/000829 designating the United States, filed on Jan. 17, 2022, in the Korean Intellectual Property Receiving Office and claiming priority to Korean Patent Application No. 10-2021-0006913, filed on Jan. 18, 2021, in the Korean Intellectual Property Office, the disclosures of which are incorporated by reference herein in their entireties.

BACKGROUND

Field

The disclosure relates to a camera having a meta-lens and a wearable electronic device including the camera.

Description of Related Art

As technology progresses, electronic devices are becoming smaller in size for easy portability and are evolving to perform various functions in various usage forms according to user needs. Such electronic devices include various types of wearable electronic devices that can be worn on parts of a user's body.

A wearable electronic device such as a glasses-type wearable electronic device or a head mounted display (HMD), may be worn directly on a user's face and may create, for example, through graphic processing, various virtual objects along with an object existing in reality, and may add the virtual objects to an image of the object existing in reality to display the virtual objects along with the object existing in reality using, for example, augmented reality (AR) technology. Glasses-type wearable devices are being implemented by mounting various electronic components including various types of sensors and displays to provide these functions.

In order to implement augmented reality, a glasses-type wearable electronic device may include a plurality of cameras. For example, in order to track the movement of a user's eyes, a glasses-type wearable electronic device may include cameras for capturing images of both eyes.

Due to the nature of glasses-type wearable electronic devices that are worn directly on a user's face, research is being conducted on ways to reduce weight and improve design aesthetics to improve wearing sensation. To this end, there is a growing need for miniaturization of various electronic components mounted on glasses-type wearable electronic devices.

SUMMARY

Embodiments of the disclosure provide a camera having a meta-lens that can be miniaturized.

Embodiments of the disclosure provide a wearable electronic device equipped with a camera including a meta-lens that can be miniaturized in order to track the movement of a user's eyes.

An electronic device according to various example embodiments disclosed herein may include a lens assembly having a stacked structure including at least one meta-lens and a spacer, and an image sensor assembly attached to one side of the lens assembly and configured to receive light passing through the lens assembly and convert the light into an optical signal. The spacer may be disposed between the image sensor assembly and the meta-lens such that a cavity is defined by an inner side surface of the spacer, a bottom surface of the meta-lens, and a top surface of the image sensor assembly.

An electronic device according to various example embodiments disclosed herein may include a frame including a first area and a second area, a window supported by the frame, a display module configured to project an image on the window, and a camera disposed in the second area of the frame to image at least a portion of a user's eye. The camera may include a lens assembly having a stacked structure including at least one meta-lens and a spacer, and an image sensor assembly attached to one side of the lens assembly and configured to receive light passing through the lens assembly and convert the light into an optical signal. The spacer may be disposed between the image sensor assembly and the meta-lens such that a cavity is defined by an inner side surface of the spacer, a bottom surface of the meta-lens, and a top surface of the image sensor assembly.

According to various example embodiments disclosed herein, a camera can be reduced in size or miniaturized by using a meta-lens.

According to various example embodiments disclosed herein, the camera structure can be simplified and the overall size and volume of the camera can be reduced.

According to various example embodiments disclosed herein, in addition to simplifying the camera structure, a camera manufacturing process can be further simplified.

According to various example embodiments disclosed herein, since the camera can be reduced in size or miniaturized, there are few restrictions on the positions at which the camera can be mounted on an electronic device. Thus, the wearing sensation of the electronic device can be improved and a design with improved aesthetics can be made.

BRIEF DESCRIPTION OF THE DRAWINGS

In connection with the description of the drawings, the same or similar components may be denoted by the same or similar reference numerals. Further, the above and other aspects, features and advantages of certain embodiments of the present disclosure will be more apparent from the following detailed description, taken in conjunction with the accompanying drawings, in which.

DETAILED DESCRIPTION

Figure 1:
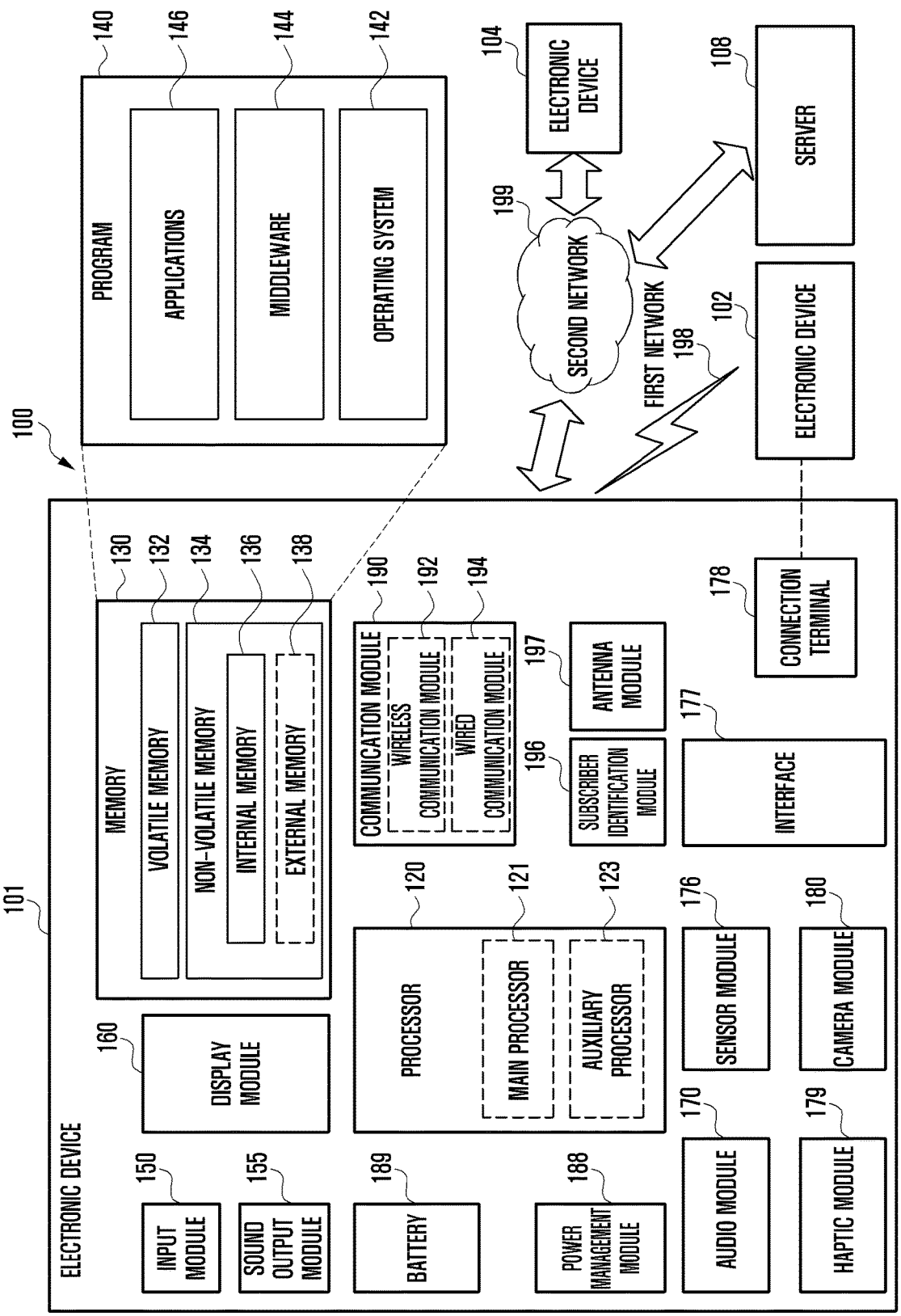
FIG. 1 is a block diagram illustrating an example electronic device in a network environment according to various embodiments.

It should be appreciated that various example embodiments of the disclosure and the terms used therein are not intended to limit the technological features set forth herein to particular embodiments and include various changes, equivalents, or alternatives for a corresponding embodiment.

With regard to the description of the drawings, similar reference numerals may be used to designate similar or relevant elements. A singular form of a noun corresponding to an item may include one or more of the items, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and do not limit the elements in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled/connected with/to the other element directly (e.g., wiredly), wirelessly, or via a third element.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121, while the main processor 121 is in an inactive (e.g., sleep) state, or together with the main processor 121, while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application(s) 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1$^{st}$" and "2nd," or "first" and "second" may be used to simply distinguish a corresponding component from another, and does not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
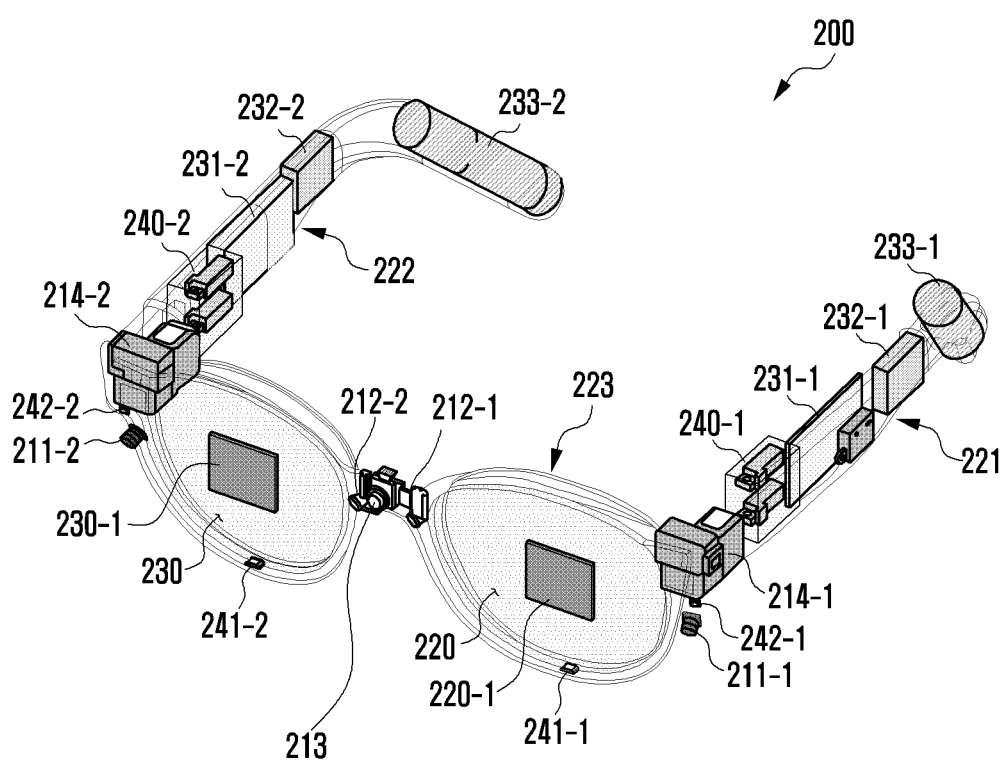
FIG. 2 is a view illustrating an overall configuration of an example electronic device including a plurality of cameras according to various embodiments.

FIG. 2 is a view illustrating an overall configuration of an example electronic device 200 (e.g., the electronic device 101 in FIG. 1) including a plurality of cameras according to various embodiments of the disclosure.

In various embodiments, the electronic device 200 may be a wearable electronic device manufactured to be worn on a user's head. For example, the electronic device 200 may be configured in the form of at least one of glasses, goggles, a helmet, or a hat, but is not limited thereto. According to an embodiment, the electronic device 200 may include a plurality of displays (e.g., the first display 220 and/or the second display 230) corresponding to both eyes (e.g., the left and/or right eyes) of the user. The displays 220 and 230 may, for example, be transparent to allow a user to see real objects (reality) and virtual objects may be projected or displayed thereon.

The electronic device 200 may, for example, provide an image related to an augmented reality (AR) service to the user. According to an embodiment, the electronic device 200 may cause at least one virtual object to be seen as being superimposed on the reality perceived by the user through the first display 220 and/or the second display 230 of the electronic device by projecting or displaying the virtual object on the first display 220 and/or the second display 230.

Referring to FIG. 2, the electronic device 200 according to an embodiment may include a main body 223, support parts (or supports) (e.g., a first support part 221 and a second support part 222), and hinge parts (or hinges) (e.g., a first hinge part 240-1 and a second hinge part 240-2).

According to various embodiments, the main body 223 and the support parts 221 and 222 may be operatively connected to each other via the hinge parts 240-1 and 240-2. The main body 223 may include a portion provided to be at least partially mounted on the user's nose.

According to various embodiments, the support parts 221 and 222 may include support members having a shape that can be put over the user's ears, respectively. The support parts 221 and 222 may include a first support part 221 for mounting on the left ear and/or a second support part 222 for mounting on the right ear.

According to various embodiments, the first hinge part 240-1 may connect the first support part 221 and the main body 223 to each other such that the first support part 221 is rotatable with respect to the main body 223. The second hinge part 240-2 may connect the second support part 222 and the main body 223 to each other such that the second support part 222 is rotatable with respect to the main body 223. According to an embodiment, the hinge parts 240-1 and 240-2 of the electronic device 200 may be omitted. For example, the support parts 221 and 222 may be directly connected to the main body 223.

According to various embodiments, the main body 223 may include at least one display (e.g., a first display 220 and a second display 230), at least one display module (e.g., a first display module 214-1 and a second display module 214-2), at least one camera module (e.g., a front imaging camera module 213), eye tracking camera modules (e.g., a first eye tracking camera module 212-1 and a second eye tracking camera module 212-2), recognition camera modules (e.g., a first recognition camera module 211-1 and a second recognition camera module 211-2), and at least one microphone (e.g., a first microphone 241-1 and a second microphone 241-2).

In the case of the electronic device 200 illustrated in FIG. 2, light generated by the display modules 214-1 and 214-2 may be projected on the displays 220 and 230 to display information. For example, the light generated by the first display module 214-1 may be projected on the first display 220, and the light generated by the second display module 214-2 may be projected on the second display 230. When light capable of displaying a virtual object is projected on the displays 220 and 230 at least partially formed of a transparent material, the user may perceive reality on which the virtual object is superimposed. In this case, it can be understood that the display module 160 described with reference to FIG. 1 includes at least some of the display modules 214-1 and 214-2 and the displays 220 and 230 in the electronic device 200 illustrated in FIG. 2. However, the electronic device described in the disclosure is not limited to displaying information through the above-described method. A display module that may be included in the electronic device may be changed to a display module including various types of information display methods. For example, when a display panel including a light-emitting element made of a transparent material is built in the displays 220 and 230 themselves, it is possible to display information without separate display modules (e.g., the first display module 214-1 and the second display module 214-2). In this case, the display module 160 described with reference to FIG. 1 may refer to the displays 220 and 230 and a display panel included in the glasses.

According to various embodiments, the virtual object output through the display modules 214-1 and 214-2 may include information related to an application program executed in the electronic device 200 and/or information related to an external object located in a real space and perceived by the user through the displays 220 and 230. The external object may include an object existing in the real space. Hereinafter, the actual space perceived by the user through the displays 220 and 230 will be referred to as a field of view (FoV) area of the user. For example, the electronic device 200 may identify an external object included in at least a portion of the area determined by the user's field of view (FoV) from the image information related to the real space acquired through the camera module (e.g., the imaging camera module 213) of the electronic device 200. The electronic device 200 may output a virtual object related to the identified external object through the display modules 214-1 and 214-2.

According to various embodiments, the electronic device 200 may display a virtual object related to an augmented reality service based on image information related to a real space acquired through the imaging camera module 213 of the electronic device 200. According to an embodiment, the electronic device 200 may display a virtual object based on the display modules disposed to correspond to the user's both eyes (e.g., the first display module 214-1 corresponding to the left eye and/or the second display module corresponding to the right eye 214-2). According to an embodiment, the electronic device 200 may display a virtual object based on preset setting information (e.g., resolution, frame rate, brightness, and/or display area).

According to various embodiments, the displays 220 and 230 may include a condensing lens (not illustrated) and/or a waveguide (e.g., the first waveguide 220-1 and/or the second waveguide 230-1). For example, the first waveguide 220-1 may be at least partially located on the first display 220, and the second waveguide 230-1 may be at least partially located on the second display 230. Light emitted from each of the display modules 214-1 and 214-2 may be incident on one surface of each of the displays 220 and 230. The light incident on one surface of each of the displays 220 and 230 may be transmitted to the user through each of the waveguides 220-1 and 230-1 located in each of the displays 220 and 230. Each of the waveguides 220-1 and 230-1 may be made of, for example, glass, plastic, or polymer, and may include a nanopattern formed on one surface of the inside or outside thereof. For example, the nanopattern may include a polygonal or curved grating structure. According to an embodiment, light incident on one surface of each of the displays 220 and 230 may be propagated or reflected inside each of the waveguides 220-1 and 230-1 by the nano-pattern to be transmitted to the user. According to an embodiment, each of the waveguides 220-1 and 230-1 may include at least one of at least one diffractive element (e.g., a diffractive optical element (DOE) or holographic optical element (HOE)) or a reflective element (e.g., a reflective mirror).

According to an embodiment, the waveguides 220-1 and 230-1 may guide the light emitted from the display modules 214-1 and 214-2 to the user's eyes using at least one diffractive element or a reflective element.

According to various embodiments, the electronic device 200 may include an imaging camera module 213 (e.g., an RGB camera module) for capturing an image corresponding to the user's field of view (FoV) and/or for measuring a distance to an object, eye tracking camera modules 212-1 and 212-2 for identifying the direction of the user's gaze, and/or recognition camera modules (gesture camera modules) 211-1 and 211-2 for recognizing a predetermined space. For example, the imaging camera module 213 may image the front direction of the electronic device 200, and the eye tracking camera modules 212-1 and 212-2 may image a direction opposite to the imaging direction of the imaging camera module 213. For example, the first eye tracking camera module 212-1 may image at least part of the user's left eye, and the second eye tracking camera module 212-2 may image at least part of the user's right eye. According to an embodiment, the imaging camera module 213 may include a high-resolution (HR) camera module and/or a photo video (PV) camera module. According to an embodiment, the eye tracking camera modules 212-1 and 212-2 may detect the user's pupils to track the gaze direction. The tracked gaze direction may be used to move a center of a virtual image including a virtual object to correspond to the gaze direction. According to an embodiment, the recognition camera modules 211-1 and 211-2 may detect a user gesture within a preset distance (e.g., a predetermined space) and/or the predetermined space. Each of the recognition camera modules 211-1 and 211-2 may include a camera module including a global shutter (GS). For example, the recognition camera modules 211-1 and 211 may be camera modules each of which includes a GS in which a rolling shutter (RS) phenomenon can be reduced in order to detect and track quick hand movements and/or minute or small movements of a finger or the like.

According to various embodiments, the electronic device 200 may detect an eye corresponding to a dominant eye and/or an auxiliary eye from among the left eye and/or the right eye using at least one camera module 211-1, 211-2, 212-1, 212-2, or 213. For example, the electronic device 200 may detect an eye corresponding to the dominant eye and/or the auxiliary eye based on the user's gaze direction with respect to an external object or a virtual object.

The number and positions of one or more camera modules (e.g., the imaging camera module 213, and the eye tracking camera modules 212-1 and 212-2 and/or the recognition camera modules 211-1 and 211-2) included in the electronic device 200 illustrated in FIG. 2 are not limited. For example, based on the type (e.g., shape or size) of the electronic device 200, the number and positions of one or more camera modules (e.g., the imaging camera module 213 and the eye tracking camera modules 212-1 and 212-2 and/or the recognition camera modules 211-1 and 211-2) may be variously changed.

According to various embodiments, the electronic device 200 may include one or more light-emitting devices (illumination LEDs) (e.g., the first light-emitting device 242-1 and the second light-emitting device 242-2) for improving the accuracy of the one or more camera modules (e.g., the imaging camera module 213 and the eye tracking camera modules 212-1 and 212-2 and/or the recognition camera modules 211-1 and 211-2). For example, the first light emitting device 242-1 may be disposed in a portion corresponding to the user's left eye, and the second light-emitting device 242-2 may be disposed in a portion corresponding to the user's right eye. In an embodiment, the light-emitting devices 242-1 and 242-2 may be used as auxiliary means (devices) for improving accuracy when imaging the user's pupils with the eye tracking camera modules 212-1 and 212-2, and may include IR LEDs that generate light having an infrared wavelength. In addition, when it is not easy to detect a subject to be imaged in a dark environment or due to mixing and reflected light of various light sources when imaging the user's gesture using the recognition camera modules 211-1 and 211-2, the light-emitting devices 242-1 and 242-2 may be used as auxiliary means.

According to various embodiments, the electronic device 101 may include a microphone (e.g., a first microphone 241-1 and a second microphone 241-2) for receiving the user's voice and ambient sounds. For example, the microphones 241-1 and 241-2 may be components included in the audio module 170 of FIG. 1.

According to various embodiments, the first support 221 and/or the second support 222 may include printed circuit boards (PCBs) (e.g., a first printed circuit board 231-1 and a second printed circuit board 231-2), speakers (e.g., a first speaker 232-1 and a second speaker 232-2), and/or batteries (e.g., a first battery 233-1 and a second battery 233-2).

According to various embodiments, the speakers 232-1 and 232-2 may include a first speaker 232-1 for transmitting an audio signal to the user's left ear and a second speaker 232-2 for transmitting an audio signal to the user's right ear. The speakers 232-1 and 232-2 may be components included in the audio module 170 of FIG. 1.

According to various embodiments, the electronic device 200 may be provided with a plurality of batteries 233-1 and 233-2, and, via a power management module (e.g., the power management module 188 in FIG. 1), power may be supplied to the printed circuit boards 231-1 and 231-2. For example, the plurality of batteries 233-1 and 233-2 may be electrically connected to the power management module (e.g., the power management module 188 in FIG. 1).

Although the electronic device 200 is described as a device that displays augmented reality, the electronic device 200 may be a device that displays virtual reality (VR). In this case, the displays 220 and 230 may be formed of an opaque material such that the user cannot recognize the actual space through the displays 220 and 230. In addition, the displays 220 and 230 may function as a display module 160. For example, each of the displays 220 and 230 may include a display panel for displaying information.

Figure 3A:
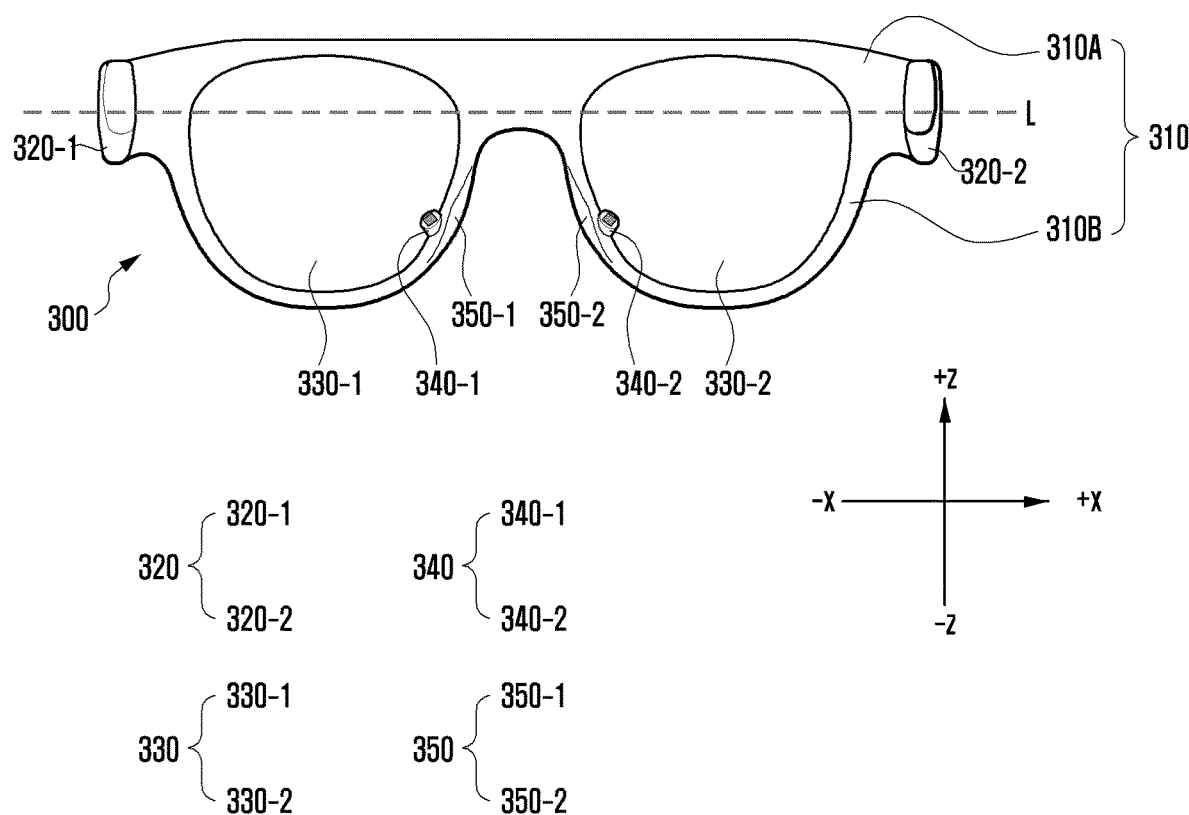
FIG. 3A is a view illustrating an example electronic device according to various embodiments.
Figure 3B:
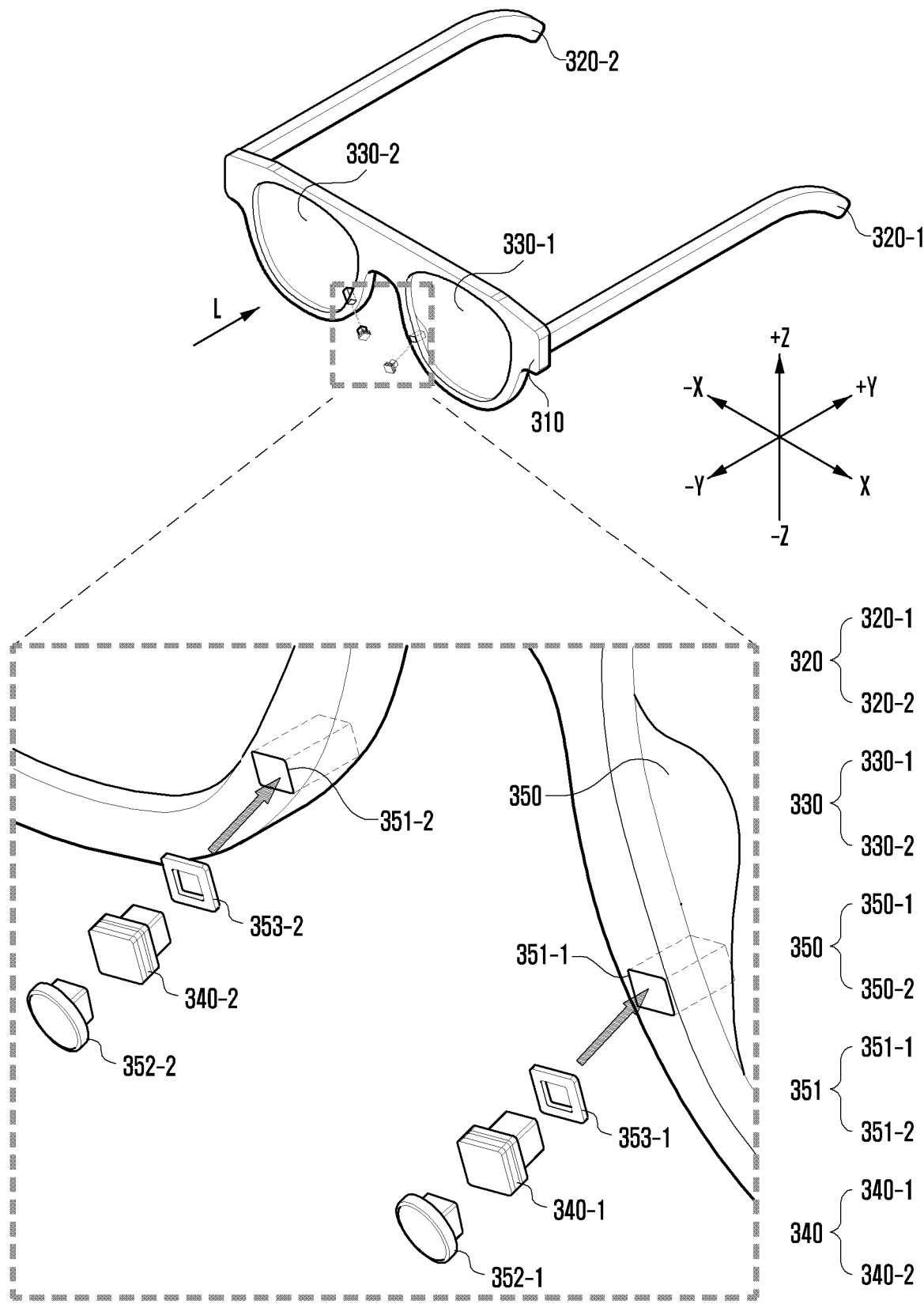
FIG. 3B is an exploded perspective view of an example electronic device and cameras according to various embodiments.

FIG. 3A is a view illustrating an example electronic device according to various embodiments disclosed herein. FIG. 3B is an exploded perspective view of an example electronic device and cameras according to various embodiments disclosed herein.

According to various embodiments, the electronic device 300 may include a frame 310 (e.g., the main body 223 in FIG. 2), a window member (or window) 330 (e.g., the first display 220 and the second display 230 in FIG. 2), a temple (or support) member 320 (e.g., the first support 221 and the second support 222 in FIG. 2), a display module (not illustrated) (e.g., the display module 160 in FIG. 1), a camera 340 (e.g., the eye tracking cameras 212-1 and 212-2 in FIG. 2), a light-emitting device (not illustrated) (e.g., the light-emitting devices 242-1 and 242-2 in FIG. 2), and a processor (not illustrated) (e.g., the processor 120 in FIG. 1). In an embodiment, the window member 330, the temple member 320, the display module, the cameras 340, and the light-emitting device may be provided in pairs to correspond to the user's left eye and right eye. For example, the window member 330 may include a first window member 330-1 and a second window member 330-2, and the temple member 320 may include the first temple member 320-1 and a second temple member 320-2, and the camera 340 may include a first camera 340-1 and a second camera 340-2. In some cases, in some of the above-described components, a configuration corresponding to the left eye and a configuration corresponding to the right eye may be different from each other.

According to various embodiments, the frame 310 may support the window member 330. The frame 310 may be formed of or include a synthetic resin material. Since the window member 330 is fitted into the opening formed in the frame 310, the frame 310 may support the window member 330.

According to various embodiments, the temple member 320 may be rotatably connected to the frame 310. The temple member 320 may include a first temple member 320-1 and a second temple member 320-2. The first temple member 320-1 may be connected to the frame 310 on the left side of the frame 310 (e.g., the −X direction of FIG. 3A), and the second temple member 320-2 may be connected to the frame 310 on the right side of the frame 310 (e.g., in the +X direction of FIG. 3A). In an embodiment, the temple member 320 may be fixedly installed on the frame. For example, the first temple member 320-1 connected to the left side of the frame 310 and the second temple member 320-2 connected to the right side of the frame 310 may be connected to each other. The temple members connected to opposite sides of the frame 310 may form a ring shape and may be worn in a manner of being fitted on the user's head. In addition, the temple member 320 may be modified in various shapes that enable the electronic device 300 to be worn on the user's face.

According to various embodiments, as illustrated in FIG. 3A, the temple member 320 may be configured to be put over the user's ears. The electronic device 300 may be worn on the user's face in such a way that the temple member 320 connected to the frame 310 is put over the user's ears. The temple member 320 may rotate relative to the frame 310. The temple member 320 may be rotated in a direction approaching the frame 310 to reduce the volume (size) of the electronic device 300.

According to various embodiments, the window member 330 may include a first window member 330-1 corresponding to the user's left eye and a second window member 330-2 corresponding to the user's right eye. The window member 330 may be supported by the frame 310. For example, the window member 330 may be fitted into an opening formed in the frame 310. An AR image emitted from the display module may be projected on the window member 330. A waveguide (e.g., the first waveguide 220-1 and/or the second waveguide 230-1 of FIG. 2) may be formed in at least a partial area of the window member 330. The waveguide may guide the AR image emitted from the display module to the user's eyes. For a detailed description of the waveguide, refer to the description related to the first display 220 and the second display 230 of FIG. 2.

According to various embodiments, the display module may output an AR image generated by the processor. When the display module generates an AR image and projects the AR image on the window member 330, an object included in the AR image is combined with the visible light L incident from the front (e.g., the −Y direction in FIG. 3B) through the window member 330 so that AR can be implemented. The display module may be a projector having a very small size (e.g., a micro projector or a pico-projector). For example, the display module may be a laser scanning display (LSD), a digital micro-mirror display (DMD), and a liquid crystal on silicon (LCoS). In addition, the display module may be a transparent display. In this case, the light-emitting device included in the display module may be directly disposed on the window member 330. In addition, the display module may be various display devices for implementing AR.

According to various embodiments, the camera 340 may include a first camera 340-1 corresponding to the user's left eye and a second camera 340-2 corresponding to the user's right eye. The camera 340 may be a camera 340 for imaging the user's eyes. The camera 340 may be, for example, the eye tracking cameras 212-1 and 212-2 of FIG. 2. The camera 340 may be used to identify the movement of the user's pupils by imaging the user's eyes in real time.

As illustrated in FIG. 3A, when the frame 310 is divided into a first area 310A and a second area 310B, the camera 340 may be disposed in the second area 310B of the frame 310. The second area 310B of the frame 310 may be an area adjacent to the user's nose in a state in which the electronic device 300 is worn. For example, as illustrated in FIG. 3A, an area extending in a first direction (e.g., the −Z direction in FIG. 3A) with reference to an imaginary line L crossing the frame 310 may be understood as the second area 310B. Alternatively, the second area 310B may be understood as an area located below the user's gaze direction gazing at the front. The camera 340 disposed in the second area 310B of the frame 310 may image the user's eyes from below the user's eyes. The first area 310A of the frame 310 may mean the remaining area of the frame 310 excluding the second area 310B. For example, as illustrated in FIG. 3A, an area extending in a second direction (e.g., the +Z direction in FIG. 3A) with reference to an imaginary line L crossing the frame 310 may be understood as the first area 310A.

According to various embodiments, the camera 340 may be inserted into a camera hole 351 provided in an abutment 350 existing in the second area 310B of the frame 310. There may be provided a pair of abutments 350 to be in contact with the user's nose in the state in which the electronic device 300 is worn. The abutment 350 may include a first abutment 350-1 located on the left side (e.g., the −X direction in FIG. 3A) with reference to the center of the frame 310 and a second abutment 350-2 located on the right side (e.g., the +X direction in FIG. 3A) with reference to the center of the frame 310. The abutment 350 may allow the frame 310 to be supported by the user's nose. In an embodiment, the abutment 350 may be integrated with the frame 310 as illustrated in FIG. 3A. In an embodiment, the abutment 350 may be configured separately from the frame 310 and coupled to the frame 310. The camera hole 351 may be a hole provided in the abutment 350. The camera hole 351 may include a first camera hole 351-1 provided in the first abutment 350-1 and a second camera hole 351-2 provided in the second abutment 350-2. The camera hole 351 may be provided to be inclined at a predetermined angle with respect to the frame 310 such that the camera 340 disposed in the second area 310B of the frame 310 may face the user's eyes. When the camera 340 is disposed by being inserted into the camera hole 351 provided to be inclined with respect to the frame 310, the camera 340 may face the user's eyes.

According to various embodiments, the camera 340 may be inserted into the camera hole 351 provided in the abutment 350 at the front of the electronic device (e.g., the −Y direction in FIG. 3B). A first camera 340-1 may be inserted into the first camera hole 351-1, and a second camera 340-2 may be inserted into the second camera hole 351-2. In an embodiment, the first camera hole 351-1 may be provided in the first abutment 350-1 or in the frame 310 at a portion adjacent to the first abutment 350-1. The second camera hole 351-2 may be provided in the second abutment 350-2 or in the frame 310 at a portion adjacent to the second abutment 350-2.

According to various embodiments, the electronic device 300 may include an element for fixing the camera 340 such that the camera 340 does not move in the camera hole 351. In an embodiment, as illustrated in FIG. 3B, a camera cover 352 and a buffer member (or buffer) 353 may be inserted into the camera hole 351 together with the camera 340. The camera cover 352 may include a first camera cover 352-1 inserted into the first camera hole 351-1 and a second camera cover 352-2 inserted into the second camera hole 351-2. The buffer member 353 may include a first buffer member 353-1 inserted into the first camera hole 351-1 and a second buffer cover 353-2 inserted into the second camera hole 351-2.

As illustrated in FIG. 3B, the camera cover 352, the camera 340, and the buffer member 353 may be inserted into the camera hole 351 in that order. In an embodiment, the camera cover 352, the buffer member 353, and the camera 340 may be inserted into the camera hole 351 in that order, and when a plurality of buffer members 353 are used, the camera cover 352, the buffer member 353, the camera 340, and the buffer member 353 may be inserted into the camera hole 351 in that order.

According to various embodiments, the camera cover 352 may have a shape naturally connected to the external shape of the abutment 350 or the external shape of the frame 310 in the state of being inserted into the camera hole 351. At least a portion of the camera cover 352 (particularly, a portion visible to the outside in the state of being inserted into the camera hole 351) may be formed of the same material as the abutment 350 and/or the frame 310. For this reason, in a state in which the camera cover 352 is inserted, the portion in which the camera hole 351 is provided may not have a different texture from other portions.

According to various embodiments, the buffer member 353 may be formed of an elastically deformable material. When the camera cover 352 and the camera 340 are pressed in the state in which the camera cover 352 is inserted into the camera hole 351, the buffer member 353 may be partially deformed and support the camera 340 disposed in the camera hole 351.

Figure 4A:
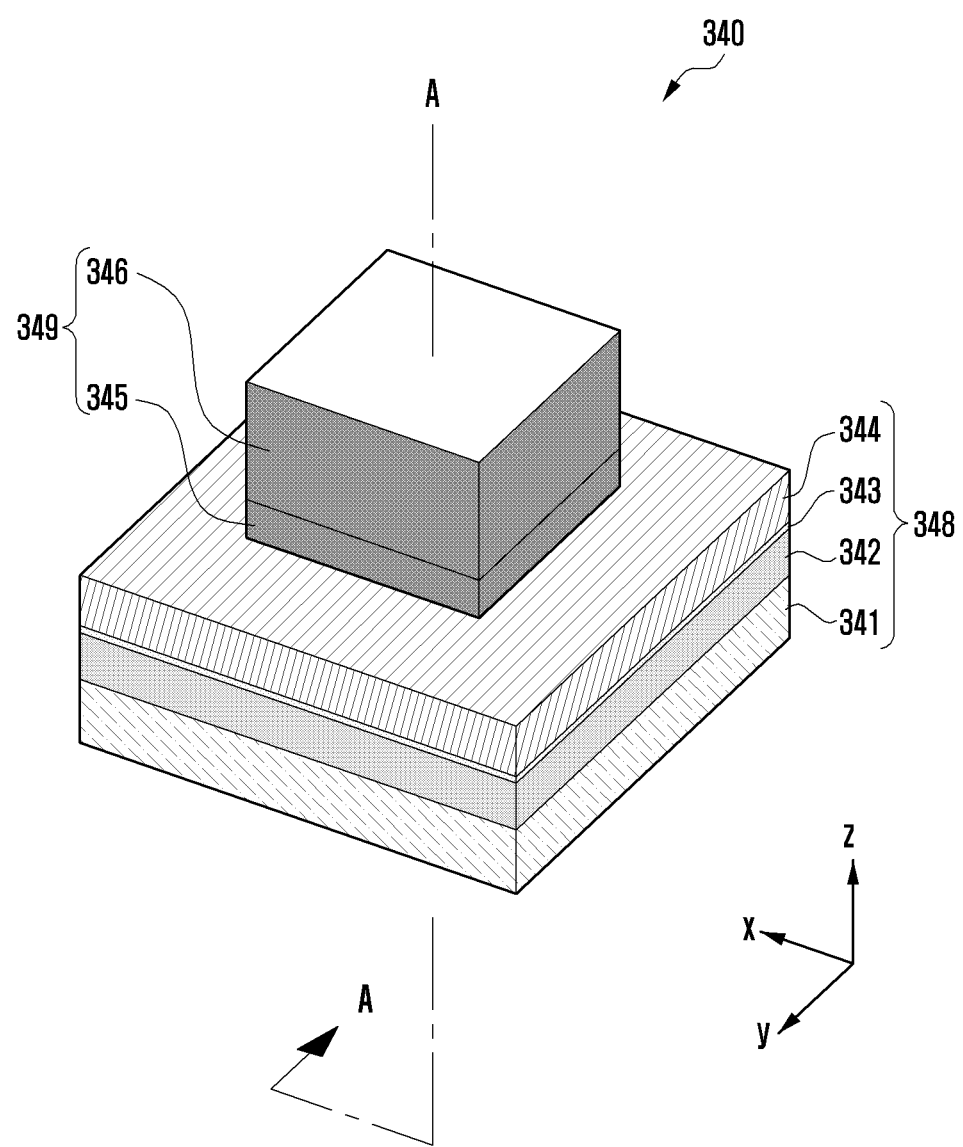
FIGS. 4A and 4B are perspective views of an example camera according to various embodiments.
Figure 4B:
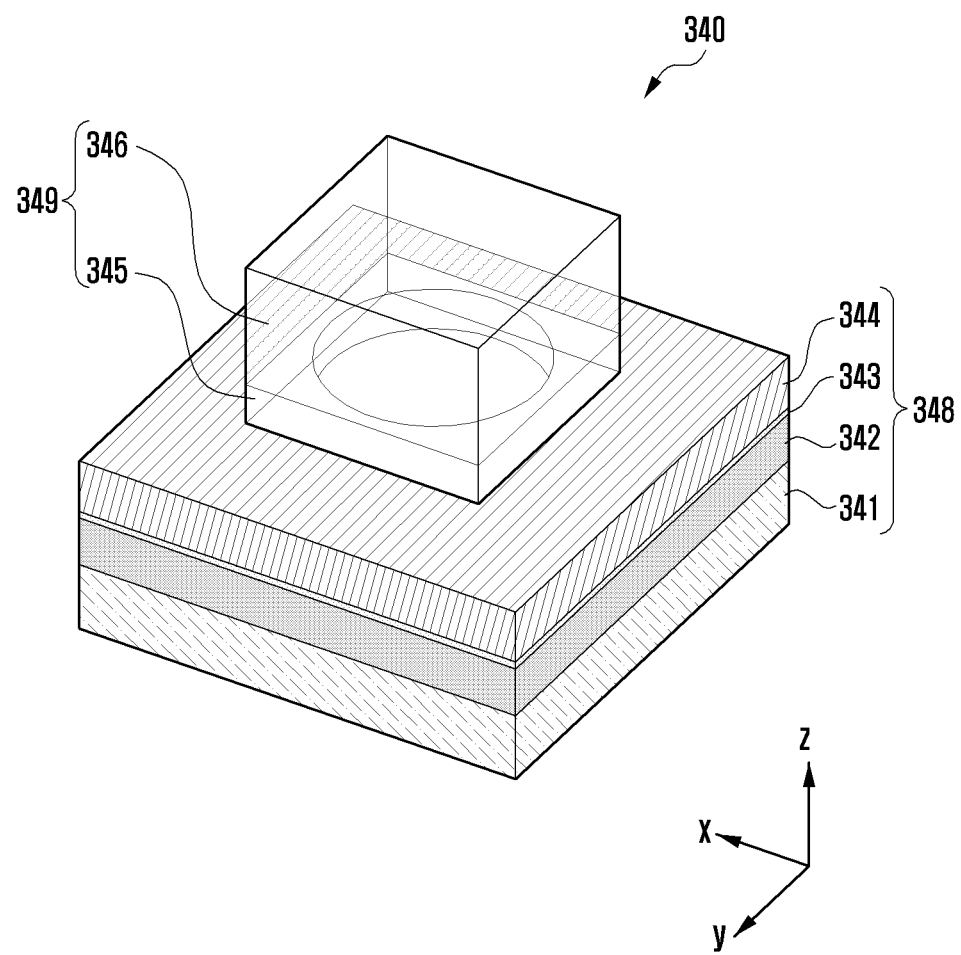
Figure 4C:
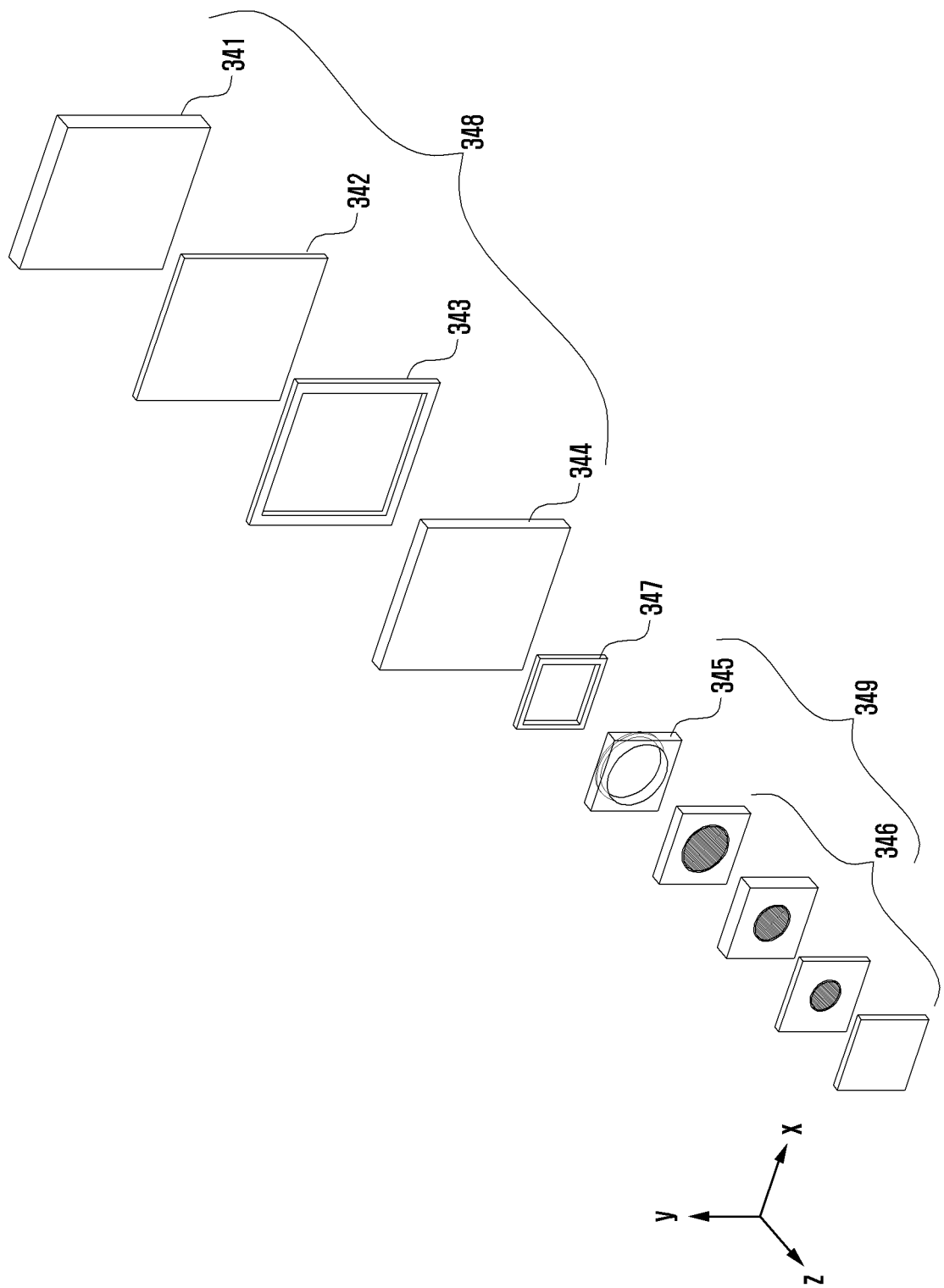
FIG. 4C is an exploded perspective view of the example camera illustrated in FIG. 4A
Figure 4D:
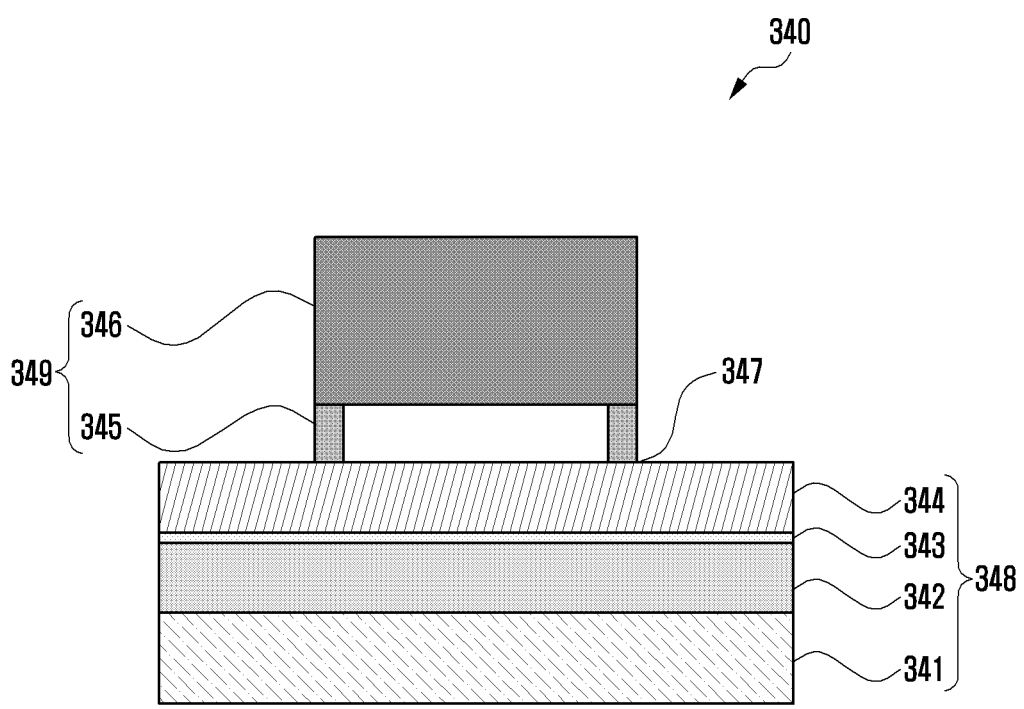
FIG. 4D is a cross-sectional view of the example camera of FIG. 4A, taken along line A-A.
Figure 4E:
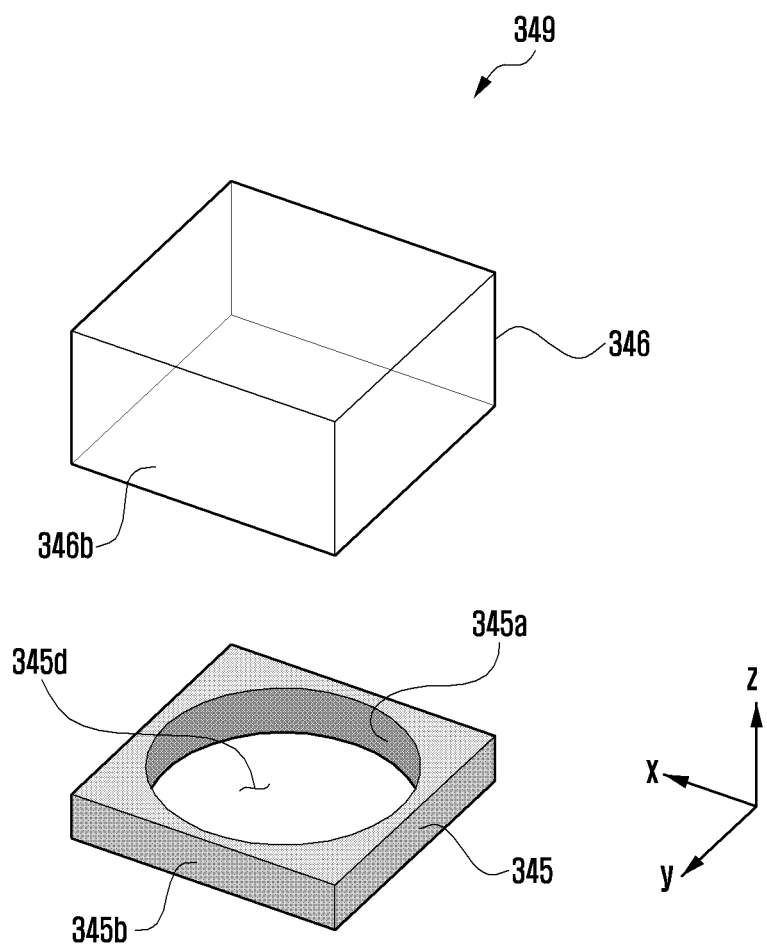
FIGS. 4E, 4F, and 4G are views for describing the structure of a lens assembly of the example camera illustrated in FIG. 4A.
Figure 4F:
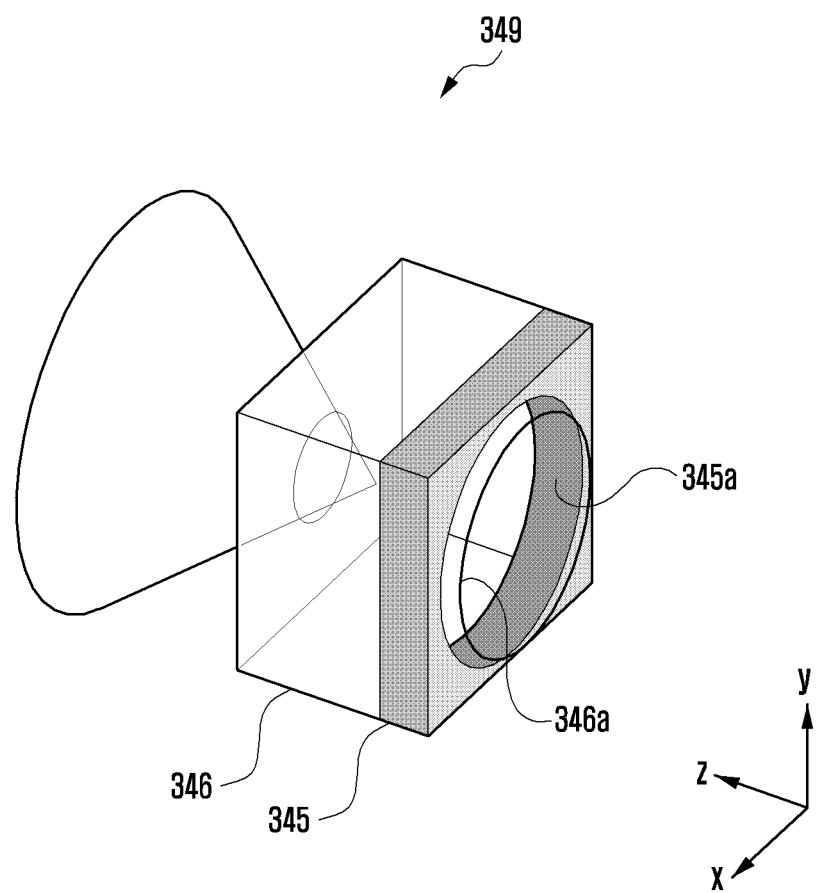
Figure 4G:
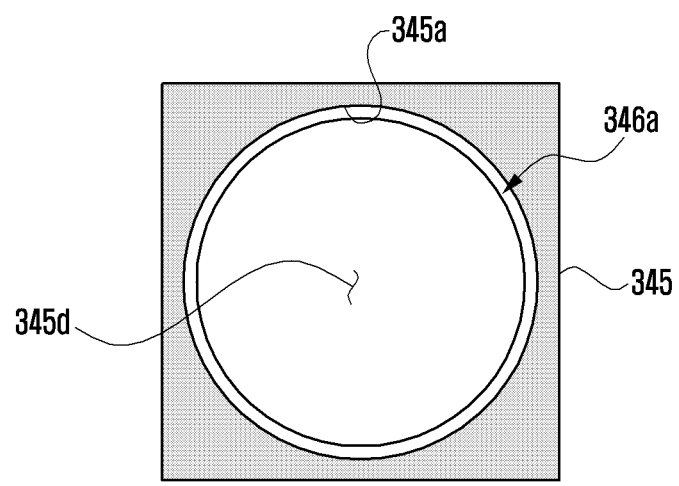

In the case of the camera 340 described below, in order to implement a compact camera 340, a separate housing for protecting the main components of the camera 340 (e.g., an image sensor (e.g., the image sensor 342 in FIG. 4A) and a substrate (e.g., the substrate 341 in FIG. 4A)) may not be provided. Since the camera 340 is inserted into the camera hole 351, the camera hole 351 may become a housing that protects the main components of the camera 340. For example, the camera hole 351 in which the camera 340 is located corresponds to the shape of the camera 340, and when viewed from the front of the electronic device (e.g., in the −Y direction in FIG. 3B), the camera hole 351 may have a narrowing shape. FIGS. 4A and 4B are perspective views of an example camera according to an embodiment disclosed herein. FIG. 4C is an exploded perspective view of the example camera illustrated in FIG. 4A. FIG. 4D is a cross-sectional view of the example camera of FIG. 4A, taken along line A-A. FIGS. 4E, 4F, and 4G are views for describing the structure of the lens assembly of the camera illustrated in FIG. 4A.

According to various embodiments, as illustrated in FIGS. 4A, 4B, 4C and 4D, the camera 340 may include an image sensor assembly 348 including a substrate 341, an image sensor 342, a first adhesive layer 343, and a protective glass 344, and a lens assembly 349 including a meta-lens 346 and a spacer member (or spacer) 345. For example, the image sensor assembly 348 and the lens assembly 349 may be bonded to each other by the second adhesive layer 347. See, e.g., FIGS. 4C and 4D. The above-mentioned configuration of the camera 340 is merely an example, and the components included in the camera 340 disclosed herein are not limited to the above configurations.

According to various embodiments, the substrate 341 may be, for example, a printed circuit board (PCB). The substrate 341 may be electrically connected to a substrate on which a processor is disposed such that image information generated by the image sensor 342 of the camera 340 can be transmitted to the processor (e.g., the processor 120 in FIG. 1) of the electronic device (e.g., the electronic device 101 of FIG. 1). For example, the substrate 341 of the camera 340 and the substrate on which the processor is disposed may be electrically connected to each other via a flexible printed circuit board (FPCB). In an embodiment, the processor may be disposed on a printed circuit board (e.g., the first printed circuit board 231-1 or the second printed circuit board 232-2 in FIG. 2) built in a temple member (e.g., the first support 221 or the second support 222 of FIG. 2). A first connection member or connector (e.g., a flexible printed circuit board) (not illustrated) disposed inside the frame 310 and extending to the camera hole 351 into which the camera 340 is inserted and a second connection member or connector (e.g., a flexible printed circuit board) (not illustrated) connected to a printed circuit board built in the temple member 320 may be connected to each other. According to an embodiment, the first connection member may be a transparent electrode and may be located on the displays (e.g., the first display 220 and the second display 230 of FIG. 2). By electrically connecting the camera 340 inserted into the camera hole 351 to the first connection member, and connecting the first connection member to the second connection member, the camera 340 can be electrically connected to the printed circuit board on which the processor is disposed.

According to various embodiments, the image sensor 342 may include a photoelectric device that converts light into an electrical signal. For example, the photoelectric device included in the image sensor 342 may be a charged coupled device (CCD) or a complementary metal-oxide semiconductor (CMOS). The image sensor 342 may be disposed on the substrate 341 to be electrically connected to the substrate 341.

According to various embodiments, the area of the substrate 341 may be substantially equal to the area of the image sensor 342. In an embodiment, the area of the substrate 341 may be equal to or smaller than the area of the image sensor 342. Since the camera 340 disclosed herein can be protected by the frame 310 or the abutment 350 of the electronic device 300 by being inserted into the camera hole 351, a separate housing for protecting the camera 340 may not be required. Accordingly, a free space for disposing the housing around the substrate 341 may not be required.

According to various embodiments, a protective glass 344 may be disposed on the image sensor 342. The protective glass 344 may be disposed on the image sensor 342 to protect the image sensor 342. The image sensor 342 and the protective glass 344 may be bonded to each other by the first adhesive layer 343 disposed along the edges of the image sensor 342.

According to various embodiments, the lens assembly 349 may include a meta-lens 346 and a spacer member 345. Referring to FIGS. 4E, 4F, and 4G, the spacer member 345 may include therein a cavity 345d to have a structure that provides an optical path through which light incident on the meta-lens 346 passes to enter the image sensor 342. For example, the spacer member 345 may include an inner side surface 345a defining the cavity 345d therein. For example, the inner side surface 345a of the spacer member 345 defines the cavity 345d together with the bottom surface of the meta-lens 346 and the top surface of the image sensor 342 (the top surface of the protective glass 344). For example, the inner side surface 345a of the spacer member 345 may be subjected to matte treatment to minimize internal reflection of light passing through the cavity 345d. For example, the inner side surface 345a of the spacer member 345 may have a through-type cylindrical shape. For example, the inner side surface 345a of the spacer member 345 may have a circular cross section, and the diameter thereof may be substantially equal to or larger than the effective diameter 346a of the meta-lens 346. For example, the diameter of the inner side surface 345a of the spacer member 345 may be configured to be 0.1 mm larger than the effective diameter 346a of the meta-lens 346. For example, the spacer member 345 may be made by processing a glass wafer.

According to various embodiments, the spacer member 345 may be configured such that the outer side surface 345b thereof is substantially flush with the outer side surface 346b of the meta-lens 346.

According to various embodiments, the lens assembly 349 may have a cross section that is at least smaller than the cross section of the image sensor assembly 348 such that the lens assembly is located within the effective detection area of the image sensor assembly 348. Accordingly, for example, when the camera 340 is disposed in the groove 351 of FIG. 3B, the buffer member 353 may be inserted to be disposed between the outer side surface of the lens assembly 349 and the top surface of the image sensor assembly 348 to prevent the camera 340 from moving.

According to various embodiments, a light blocking agent (e.g., black paint) may be applied to at least a part of the outer side surface 345b of the spacer member 345, the outer side surface 346b of the meta-lens 346, and the top surface of the protective glass 344 (e.g., outside of the area to which the spacer member 345 is attached) in order to block external light.

According to various embodiments, the lens assembly 349 including the meta-lens 346 and the spacer member 345 may be disposed on the protective glass 344. For example, the protective glass 344 and the lens assembly 349 may be bonded to each other by the second adhesive layer 347 disposed along the edges of the spacer member 345. In this case, the protective glass 344 and the lens assembly 349 may be spaced apart from each other by a predetermined interval. This interval may be utilized to compensate for a difference between cameras 340 in the manufacturing process of the cameras 340 so that the cameras 340 can generate image information having a predetermined quality at the time of assembling the cameras 340. Such a difference may be caused by various factors (e.g., an assembly tolerance, a specification error of the image sensor 342, or the like). For example, the difference may occur due to minute changes in optical design factors such as thickness, interval, and eccentricity of lens layers constituting the meta-lens 346. In order for the camera 340 disclosed herein to be disposed in an electronic device to image the user's eyes with a predetermined quality, it is necessary to compensate for this difference. When an interval is provided between the protective glass 344 and the lens assembly 349 and the interval is applied differently for each camera 340 when assembling the camera 340, it is possible to compensate for the difference between cameras 340 in the process of assembling the cameras 340. In an embodiment, the second adhesive layer 347 disposed between the protective glass 344 and the lens assembly 349 may be formed of a light or heat curable material. The second adhesive layer 347 may have a certain level of fluidity before being cured. The position of the lens assembly 349 may be adjusted with respect to the protective glass 344 (e.g., adjusted through rotation about the X-axis, Y-axis, and Z-axis of FIG. 4B) to compensate for the error of the camera 340. When the position of the lens assembly 349 with respect to the protective glass 344 is aligned, the second adhesive layer 347 may be cured using light or heat.

Figure 5A:
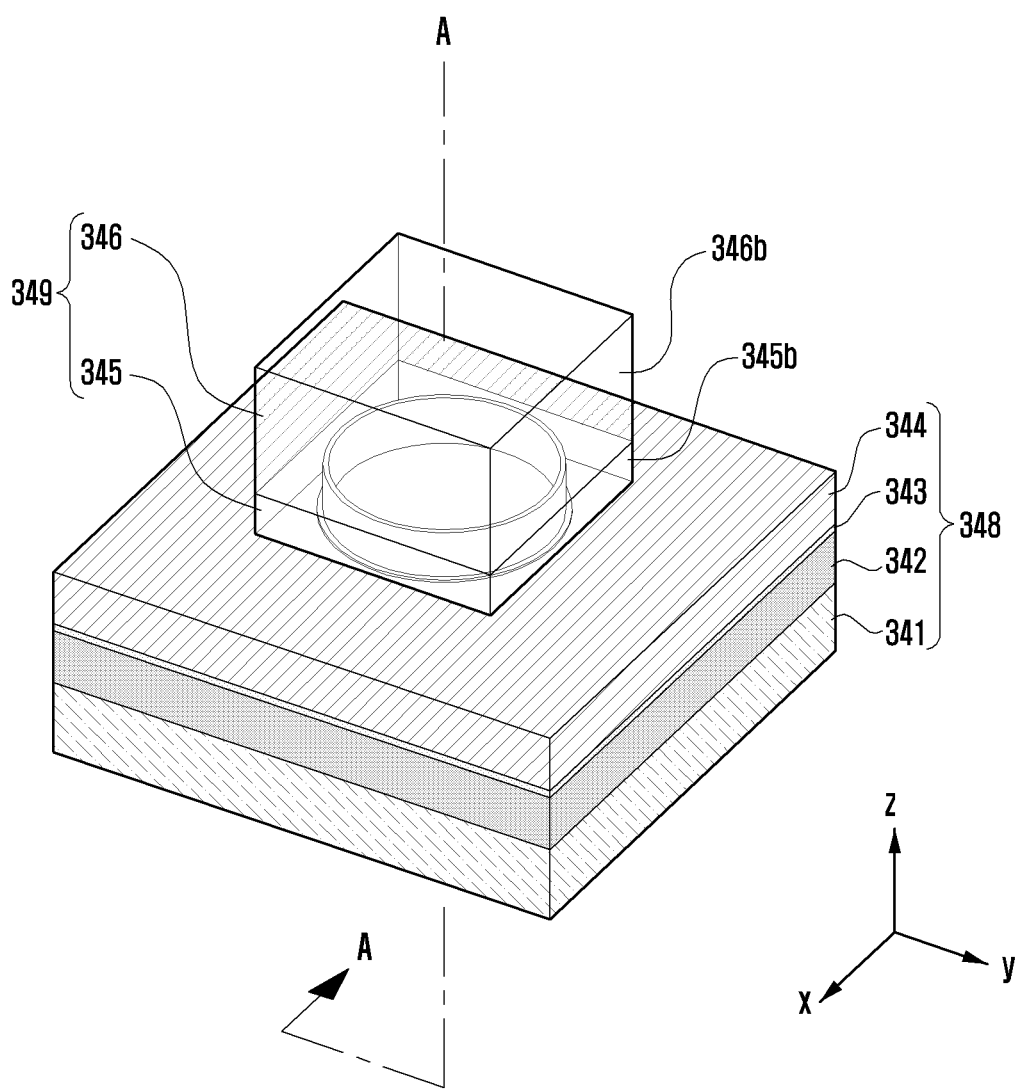
FIG. 5A is a perspective view of an example camera according to another embodiment.
Figure 5B:
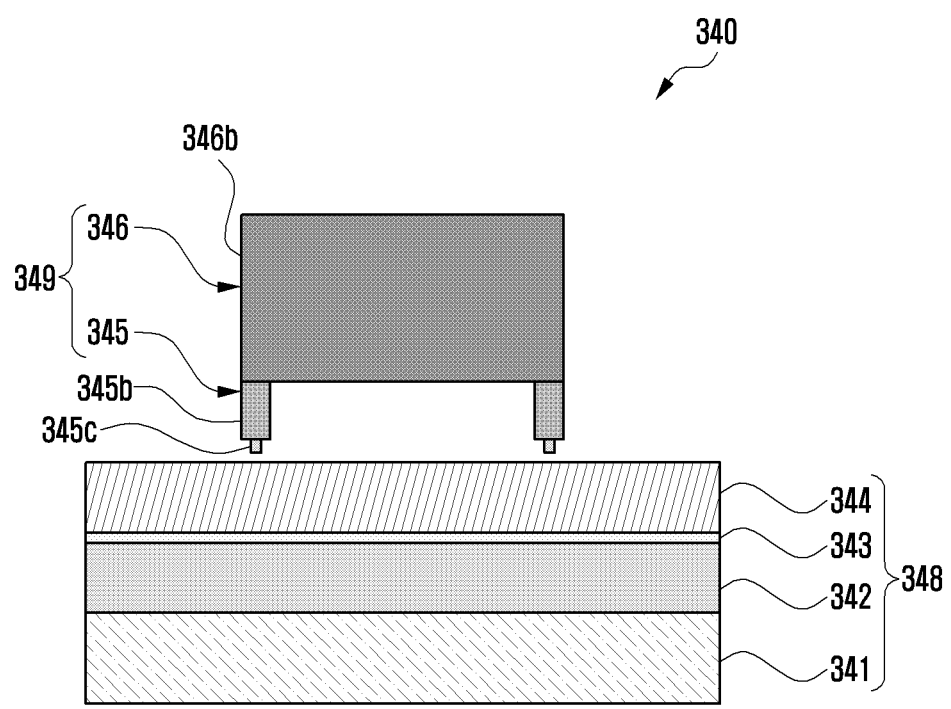
FIG. 5B is a cross-sectional view of the example camera of FIG. 5A, taken along line A-A.
Figure 5C:
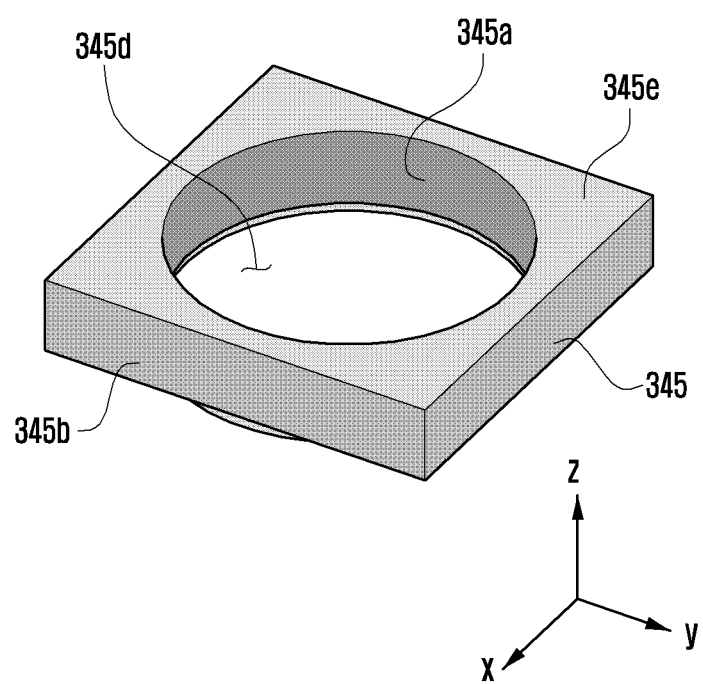
FIGS. 5C, 5D, and 5E are views for describing the structure of a lens assembly of the example camera illustrated in FIG. 5A.
Figure 5D:
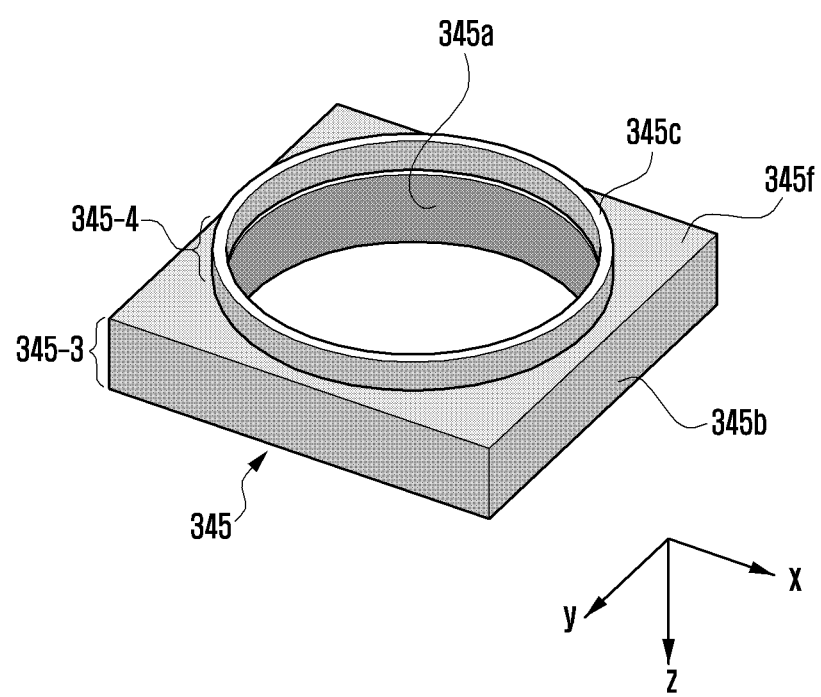
Figure 5E:
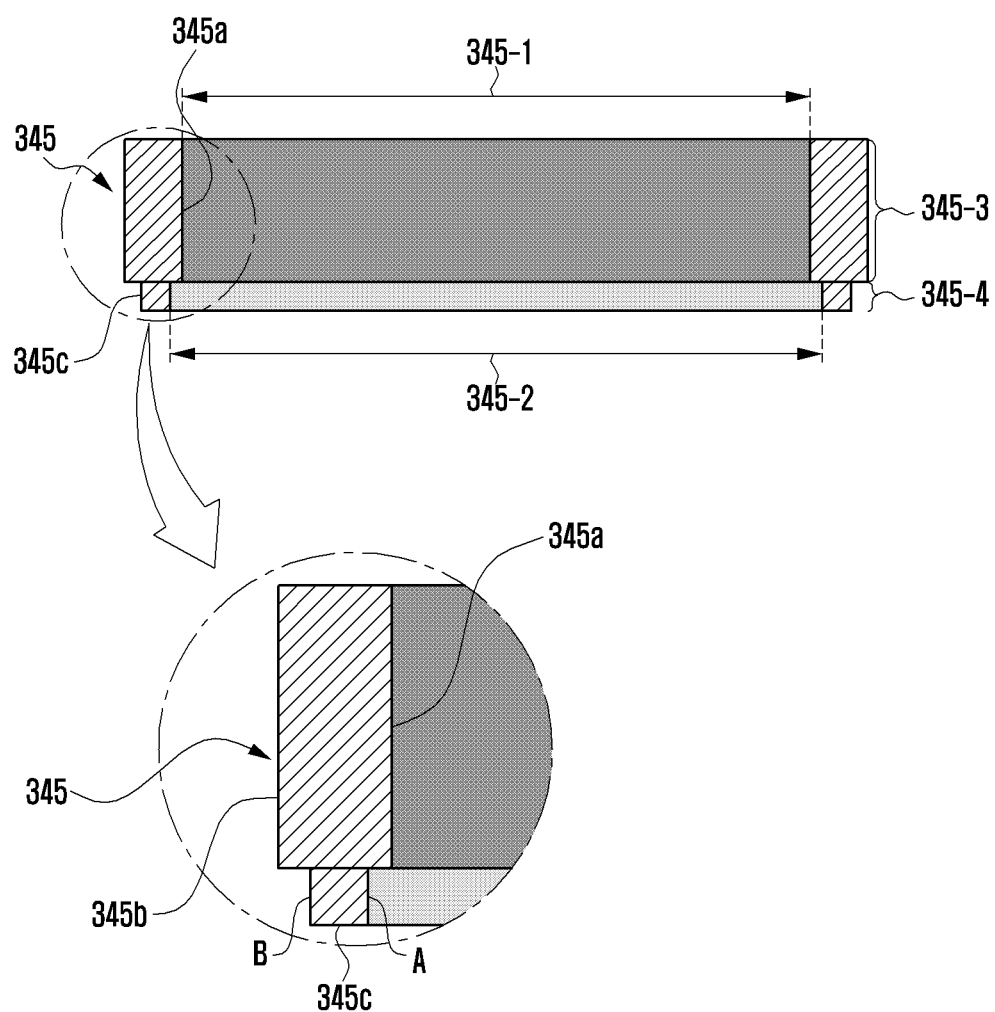

FIG. 5A is a perspective view of an example camera according to an embodiment disclosed herein. FIG. 5B is a cross-sectional view of the example camera of FIG. 5A, taken along line A-A. FIGS. 5C, 5D, and 5E are views for describing the structure of the lens assembly of the example camera illustrated in FIG. 5A.

According to various embodiments, as illustrated in FIGS. 5A and 5B, the camera 340 may include a sensor assembly 348 including a substrate 341, an image sensor 342, a first adhesive layer 343, and a protective glass 344, and a lens assembly 349 including a meta-lens 346 and a spacer member 345. For example, the sensor assembly 348 and the lens assembly 349 may be bonded to each other by the second adhesive layer 347. The above-mentioned configuration of the camera 340 is merely an example, and the components included in the camera 340 disclosed herein are not limited to the above configurations. Hereinafter, a description of a configuration the same as or similar to a configuration described with reference to FIGS. 4A to 4F will not be repeated.

According to various embodiments, referring to FIG. 5B, the spacer member 345 attached to the meta-lens 346 of the lens assembly 349 may include a protrusion 345c provided in a portion of the surface thereof, which is attached to the sensor assembly 348, opposite to the surface to which the meta-lens 346 is attached.

According to various embodiments, referring to FIGS. 5A, 5B, 5C, 5D, and 5E, the spacer member 345 may include a first area 345-3 including an inner side surface 345a configured in a cylindrical shape to define therein a through-type cavity 345d and an outer side surface 345b configured to be substantially flush with the outer side surface 346b of the meta-lens 346, and may include a top surface 345e attached to the meta-lens 346 as illustrated in FIG. 5C and a bottom surface 345f attached to the sensor assembly 348 as illustrated in FIG. 5D. The spacer member 345 may include the protrusion 345c in the second area 345-4, and the protrusion 345c provided in the second area may be configured in a cylindrical shape on the bottom surface 345f of the spacer member 345 along the cylindrical shape of the inner side surface 345a.

Referring to FIG. 5E, according to various embodiments, the outer side surface (B in FIG. 5E) of the protrusion 345c in the second area 345-4 of the spacer member 345 may be configured to provide a step inwardly recessed from the outer side surface 345b of the spacer member 345. For example, at the time of bonding the second sensor assembly 348 and the lens assembly 349 to each other, when an adhesive is applied along the outer side surface of the spacer member in order to form the second adhesive layer 347 and has a certain level of fluidity before being cured, the step provide by the outer side surface B of the protrusion 345a can reduce or prevent the adhesive from flowing toward the inner side surface 345a of the spacer member 345 into the optical path of the meta-lens 346.

Referring to FIG. 5E, according to various embodiments, the inner side surface (A of FIG. 5E) of the second area 345-4 in which the protrusion 345c of the spacer member 345 is provided may be flush with or may be recessed from the inner side surface of the first area 345-3 of the spacer member 345. Thus, the inner diameter 345-2 of the protrusion 345c may be equal to or greater than the inner diameter of the main body of the spacer member 345. For example, since the diameter 345-2 of the inner side surface A of the protrusion 345c is configured to be equal to or greater than the diameter 345-1 of the inner side surface 345a of the spacer member 345, effects on the optical path of light passing through the meta-lens 346 and spacer member 345 and incident to sensor assembly 348 may be reduced or eliminated.

FIGS. 6A, 6B, 6C, and 6D are views for describing a structure of an example lens assembly of a camera and a manufacturing process thereof according to various embodiments disclosed herein.

Figure 6A:
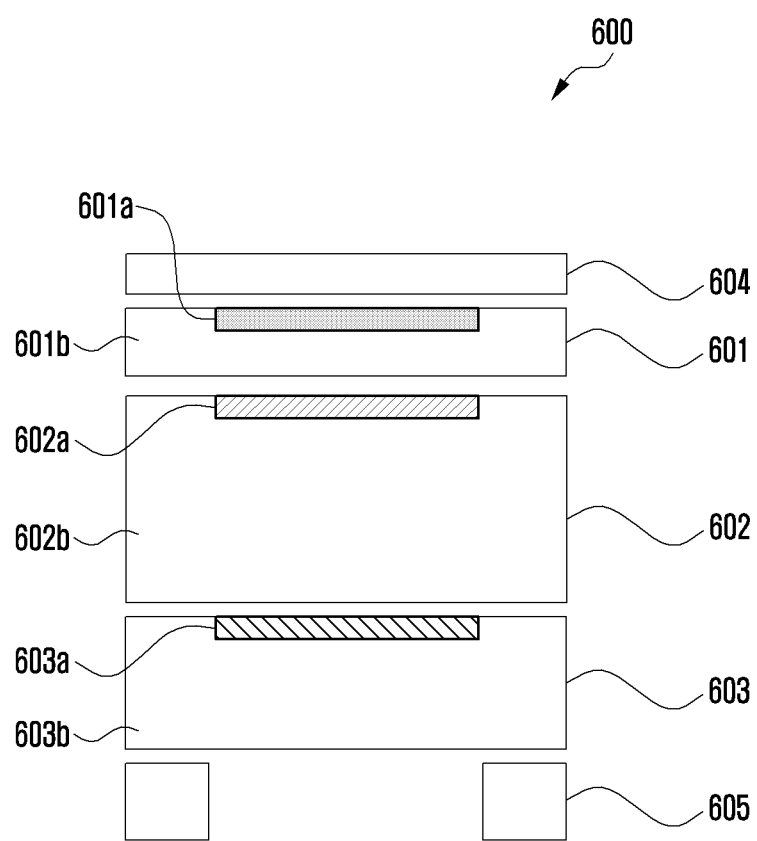
FIGS. 6A, 6B, 6C, and 6D are views for describing a structure of a lens assembly of an example camera and a manufacturing process thereof according to various embodiments.

According to various embodiments, referring to FIG. 6A, the lens assembly 600 (e.g., the lens assembly 349 in FIGS. 4A, 4B, 4C, 4D, 4E, 4F, 4G, 5A, 5B, 5C, 5D, and 5E) may have a structure in which an array of multiple meta-lenses (e.g., a first meta-lens 601, a second meta-lens 602, and a third meta-lens 603) are stacked, a cover glass 604 is attached to the top surface of the array, and a spacer member 605 (e.g., the spacer member 345 in FIGS. 4A, 4B, 4C, 4D, 4E, 4F, 4G, 5A, 5B, 5C, 5D, and 5E) is attached to the bottom surface of the array. Here, an example in which the lens assembly 600 includes three meta-lenses has been described, but the disclosure is not limited in this respect. The lens assembly 600 according to various embodiments may be configured by stacking various numbers of meta-lenses.

According to various embodiments, the first meta-lens 601, the second meta-lens 602, and the third meta-lens 603 may have respective planar polarization-insensitive meta-surfaces (e.g., a first meta-surface 601a, a second meta-surface 602a, and a third meta-surface 603a).

According to various embodiments, the first meta-surface 601a, the second meta-surface 602a, and the third meta-surface 603a of the first meta lens 610, the second meta lens 602, and the third meta lens 603 may be formed on respective substrates (e.g., the first substrate 601b, the second substrate 602b, and the third substrate 603c).

Figure 6B:
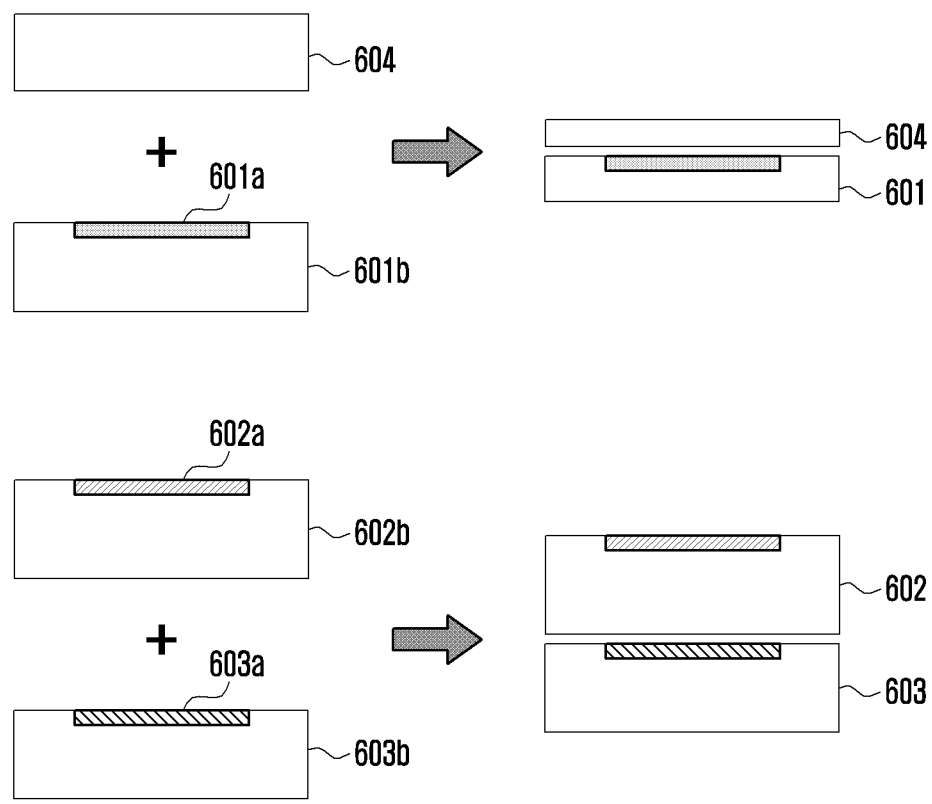

Referring to FIG. 6B, in order to manufacture the lens assembly 600 of FIG. 6A, each of the first meta-lens 601, the second meta-lens 602, and the third meta-lens 603 may be prepared.

According to various embodiments, the first meta-lens 601, the second meta-lens 602, and the third meta-lens 603 may be formed by attaching the first meta-surface 601a, the second meta-surface 602a, and the third meta-surface 603a to the first substrate 601b, the second substrate 602b, and the third substrate 603b, respectively. For example, the substrate may be made of silicon dioxide ($SiO_2$), but the material of the substrate 110 is not limited thereto. For example, the substrate may be made of silicon or polydimethylsiloxane. For example, the meta-surfaces may be made of hydrogenated amorphous silicon (a-Si:H), but is not limited thereto.

According to various embodiments, each meta-lens may be manufactured by depositing hydrogenated amorphous silicon on a substrate, coating the same with a resist, forming a pattern by emitting an electron beam, depositing a metal layer (e.g., chromium (Cr) or aluminum (Al)), and removing the metal layer after a lift-off process and an etching process. For example, hydrogenated amorphous silicon (a-Si:H) may be laminated on the substrate through plasma enhanced chemical vapor deposition (PECVD). For example, a pattern on a meta-surface may be formed by coating a resist layer and performing electron beam lithography (EBL). For example, after exposure is performed, chromium (Cr) or aluminum (Al) is deposited through electron beam deposition, and then a lift-off process may be performed. For example, the silicon layer may be removed through dry etching using a patterned chromium (Cr) or aluminum (Al) layer as a mask for etching the silicon, and by removing the chromium (Cr) or aluminum (Al) mask, a meta-surface including nano-structures may be provided on a substrate.

According to various embodiments, a cover glass 604 may be provided, and a bonding process may be performed together with the prepared first meta-lens 601, the second meta-lens 602, and the third meta-lens 603. For example, after bonding the second meta-lens 602 and the third meta-lens 603 and bonding the cover glass 604 and the first meta-lens 601, these bonded layers may be stacked and bonded. The order of stacking and bonding of the meta-lenses is not limited, and the stacking and bonding may be performed in various ways. For example, a grinding process may be additionally performed on the surface of the substrate or the cover glass to make the meta-lens or the cover glass have a predetermined thickness during the bonding process.

Figure 6C:
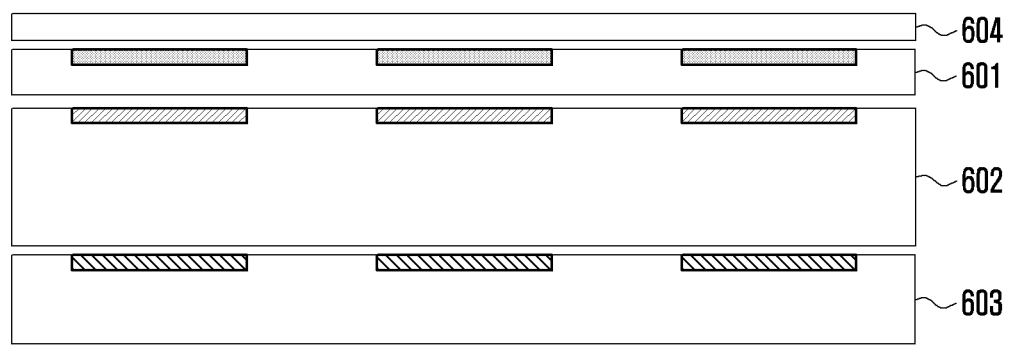

Referring to FIG. 6C, as the cover glass 604 layer, the first meta-lens 601 layer, the second meta-lens 602 layer, and the third meta-lens 603 layer are stacked and bonded according to the bonding process, the meta-lens layers can be configured.

Figure 6D:
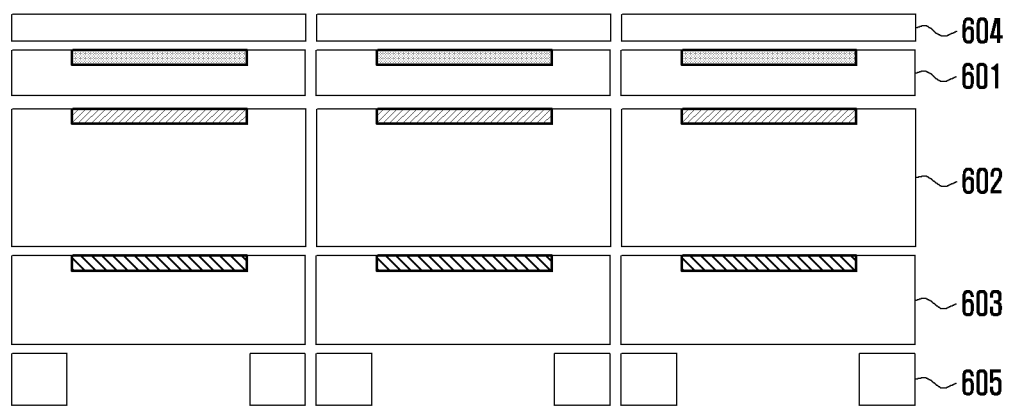

Referring to FIG. 6D, a spacer member 605 may be attached to the meta lens layers in which the cover glass 604 layer, the first meta-lens 601 layer, the second meta-lens 602 layer, and the third meta-lens 603 layer configured according to the bonding process are stacked. For example, the spacer member 605 layer may be provided as a glass wafer and may have a through-type cavity formed therein, for example in a physical manner. For example, the spacer member 605 layer may be attached to the third substrate 603b of the third meta-lens 603 opposite to the cover glass 604.

Referring to FIG. 6D, after the spacer member 605 layer is attached to the cover glass 604 layer, the first meta-lens 601 layer, the second meta-lens layer 602 and the third meta-lens 603 layer, an individual lens assembly 600 may be manufactured through a dicing process.

As described above, the camera 340 included in the electronic device disclosed herein may have a simplified structure and a reduced overall size or volume compared to a conventional camera. According to various embodiments disclosed herein, a camera manufacturing process can be further simplified. According to various embodiments disclosed herein, since the camera size can be reduced or minimized, restrictions on the position at which the camera can be mounted on an electronic device can be relaxed or eliminated. Thus, the wearing sensation of the electronic device can be improved and a design with improved aesthetics can be made.

According to various embodiments, an electronic device (e.g., the camera 340) may include a lens assembly (e.g., the lens assembly 349) having a stacked structure including at least one meta-lens (e.g., the meta-lens 346) and a spacer (e.g., the spacer member 345), and an image sensor assembly (e.g., the image sensor assembly 348) attached to one side of the lens assembly and configured to receive light passing through the lens assembly and convert the light into an optical signal. The spacer may be disposed between the meta-lens and the image sensor assembly such that a cavity (e.g., the cavity 345d) is defined by an inner side surface (e.g., the inner side surface 345a) of the spacer, a bottom surface of the meta-lens, and a top surface of the image sensor assembly.

According to various embodiments, the inner side surface of the spacer member may have a cylindrical shape and a cross-section thereof may have a diameter equal to or greater than an effective diameter outline of the at least one meta-lens.

According to various embodiments, the lens assembly may have a cross section that is equal to or smaller than the cross section of the image sensor assembly so as to be located inside an effective detection area of the image sensor assembly.

According to various embodiments, the spacer includes an outer side surface substantially flush with outer side surface of the at least one meta-lens.

According to various embodiments, a light blocking agent may be applied to at least a portion of the outer side surface of the spacer, the outer side surface of the at least one meta-lens, and the top surface of the image sensor assembly.

According to various embodiments, the inner side surface of the spacer member may be subjected to matte treatment and comprise a matte surface.

According to an embodiment, the spacer may include a first portion having an (e.g., 345-3) outer side surface substantially flush with an outer side surface of the at least one meta-lens and a protruding second portion (e.g., 345-4) protruding from the first portion.

According to an embodiment, the inner side surface of the second portion has a cross section having a diameter equal to or greater than that of the cross section of the inner side surface of the first portion of the spacer.

According to an embodiment, the protrusion forms a step recessed inward from the outer side surface of the first portion of the spacer.

According to an embodiment, the step is configured to reduce or prevent an adhesive applied along the outer side surface of the spacer attached to the image sensor assembly from flowing into the spacer.

According to an embodiment, in a process of manufacturing the lens assembly, the spacer member may be attached to the at least one meta-lens and then diced together with the at least one meta-lens to form the lens assembly.

According to various embodiments, an electronic device (e.g., the electronic device 200) may include a frame (e.g., the frame 310) including a first portion (e.g., the first area 310A) and a second portion (e.g., the second area 310B), a window (e.g., the window member 330) supported by the frame, a temple (support) member (e.g., temple member 320) rotatably connected to the frame, a display module configured to project an image on the window, and a camera (e.g., the camera 340) disposed in the second portion of the frame to image at least a portion of a user's eye. The camera may include a lens assembly (e.g., the lens assembly 349) including a stacked structure including at least one meta-lens (e.g., the meta-lens 346) and a spacer (e.g., the spacer member 345), and an image sensor assembly (e.g., the image sensor assembly 348) attached to one side of the lens assembly and configured to receive light passing through the lens assembly and convert the light into an optical signal. The spacer may be disposed between the at least one meta-lens and the image sensor assembly such that a cavity (e.g., the cavity 345d) is defined by an inner side surface (e.g., the inner side surface 345a) of the spacer, a bottom surface of the meta-lens, and a top surface of the image sensor assembly.

According to an embodiment, the camera may be disposed in a groove (e.g., the camera hole 351) provided in an abutment (e.g., the abutment 350) inclined by a predetermined angle relative to the frame such that the camera faces a user's eye, wherein the abutment is provided in the second portion of the frame to be in contact with a nose of a user wearing the electronic device.

According to an embodiment, the lens assembly may have a cross section that is equal to or smaller than the cross section of the image sensor assembly such that the lens assembly is located inside an effective detection area of the image sensor assembly, and the electronic device may further include a buffer disposed (e.g., the buffer member 353) between the outer side surface of the lens assembly and the top surface of the image sensor assembly to fix the camera in the groove.

According to an embodiment, the spacer may be configured such that an outer side surface thereof is substantially flush with outer side surface of the at least one meta-lens.

According to an embodiment, in a process of manufacturing the lens assembly, the spacer member may be attached to the at least one meta-lens and then diced together with the at least one meta-lens to configure the outer side surface thereof.

According to an embodiment, a light blocking agent may be applied to at least a portion of the outer side surface of the spacer, the outer side surface of the at least one meta-lens, and the top surface of the image sensor assembly.

According to an embodiment, the inner side surface of the spacer may be subjected to matte treatment and comprise a matte surface.

According to an embodiment, the spacer may include a protrusion provided on a bottom surface thereof.

According to an embodiment, the protrusion may form a step recessed inward from the outer side surface of the spacer member to reduce prevent flow of an adhesive applied along the outer side surface of the spacer member attached to the image sensor assembly into the spacer member.

The embodiments disclosed herein are merely presented as examples for easy description of technical features and helping the understanding of the technical features, and are not intended to limit the scope of the technology disclosed herein. Therefore, the scope of the technology disclosed herein should be construed to include all changes or modifications derived from the technical ideas of various embodiments disclosed herein in addition to the embodiments disclosed herein.

What is claimed is:

1. An electronic device comprising:
a lens assembly including a stacked structure comprising at least one meta-lens and a spacer; and
an image sensor assembly, comprising an image sensor, attached to one side of the lens assembly and configured to receive at a top surface thereof light passing through the lens assembly and convert the light into an optical signal,
wherein the spacer is disposed between the at least one meta-lens and the image sensor assembly such that a cavity is defined by an inner side surface of the spacer, a bottom surface of the meta-lens, and the top surface of the image sensor assembly,
wherein the spacer includes a first portion having an outer side surface substantially flush with an outer side surface of the at least one meta-lens, and a protruding second portion protruding from the first portion.

2. The electronic device of claim 1, wherein the inner side surface of the spacer has a cylindrical shape and a cross-section thereof has a diameter equal to or greater than an effective diameter of the at least one meta-lens.

3. The electronic device of claim 1, wherein a cross-section of the lens assembly is equal to or smaller than a cross section of the image sensor assembly such that the lens assembly is located within an effective detection area of the image sensor assembly.

4. The electronic device of claim 1, further comprising a light blocking agent applied to at least a portion of the outer side surface of the first portion of the spacer, the outer side surface of the at least one meta-lens, and the top surface of the image sensor assembly.

5. The electronic device of claim 1, wherein the inner side surface of the spacer comprises a matte surface.

6. The electronic device of claim 1, wherein a cross section of an inner side surface of the second portion has a diameter equal to or greater than a diameter of a cross section of an inner side surface of the first portion of the spacer.

7. The electronic device of claim 6, wherein the second portion forms a step recessed inwardly from the outer side surface of the first portion of the spacer.

8. The electronic device of claim 7, wherein the step is configured to reduce or prevent adhesive applied along the outer side surface of the spacer attached to the image sensor assembly from flowing into the spacer.

9. The electronic device of claim 1, wherein, in a process of manufacturing the lens assembly, the spacer is attached to the at least one meta-lens and then diced together with the at least one meta-lens to form the lens assembly.

10. An electronic device comprising:
a frame including a first portion and a second portion;
a window supported by the frame;
a display module configured to project an image on the window; and
a camera disposed in the second portion of the frame to image at least a portion of an eye,
wherein the camera includes:
a lens assembly including a stacked structure comprising at least one meta-lens and a spacer; and
an image sensor assembly, comprising an image sensor, attached to one side of the lens assembly and configured to receive at a top surface thereof light passing through the lens assembly and convert the light into an optical signal, and
wherein the spacer is disposed between the at least one meta-lens and the image sensor assembly such that a cavity is defined by an inner side surface of the spacer, a bottom surface of the meta-lens, and the top surface of the image sensor assembly, and
wherein the spacer includes a first portion having an outer side surface substantially flush with an outer side surface of the at least one meta-lens, and a protruding second portion protruding from the first portion.

11. The electronic device of claim 10, wherein the camera is disposed in a groove provided in an abutment inclined by a predetermined angle relative to the frame such that the camera faces the eye, wherein the abutment is provided in the second portion of the frame to be in contact with a nose of a user wearing the electronic device.

12. The electronic device of claim 11, wherein a cross section of the lens assembly is equal to or smaller than a cross section of the image sensor assembly such that the lens assembly is located inside an effective detection area of the image sensor assembly, and the electronic device further comprises a buffer disposed between an outer side surface of the lens assembly and the top surface of the image sensor assembly to fix the camera in the groove.

13. The electronic device of claim 10, wherein, in a process of manufacturing the lens assembly, the spacer is attached to the at least one meta-lens and then diced together with the at least one meta-lens to configure the outer side surface thereof.

14. The electronic device of claim 10, further comprising a light blocking agent applied to at least a portion of the outer side surface of the first portion of the spacer, the outer side surface of the at least one meta-lens, and the top surface of the image sensor assembly.

15. The electronic device of claim 10, wherein the inner side surface of the spacer comprises a matte surface.

16. The electronic device of claim 10, wherein the protruding second portion forms a step recessed inwardly from the outer side surface of the first portion of the spacer to reduce or prevent flow of an adhesive applied along the outer side surface of the spacer attached to the image sensor assembly into the spacer.

\* \* \* \* \*